(12) United States Patent
Okamoto

(10) Patent No.: US 8,413,685 B2
(45) Date of Patent: Apr. 9, 2013

(54) CONTROL VALVE

(75) Inventor: Eiji Okamoto, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 12/674,729

(22) PCT Filed: Aug. 27, 2008

(86) PCT No.: PCT/JP2008/065267
§ 371 (c)(1),
(2), (4) Date: Feb. 23, 2010

(87) PCT Pub. No.: WO2009/028534
PCT Pub. Date: Mar. 5, 2009

(65) Prior Publication Data
US 2011/0114204 A1    May 19, 2011

(30) Foreign Application Priority Data
Aug. 31, 2007  (JP) ................................. 2007-225746

(51) Int. Cl.
*F16K 11/07* (2006.01)
(52) U.S. Cl. .............. 137/625.69; 137/596.17; 137/597; 137/627.5; 137/628
(58) Field of Classification Search ............. 137/596.17, 137/597, 627.5, 628, 625.69; 303/119.2
See application file for complete search history.

(56) References Cited

U.S. PATENT DOCUMENTS

| 3,147,047 A | * | 9/1964 | Fites | 137/627.5 |
|---|---|---|---|---|
| 3,169,804 A | * | 2/1965 | Bueler et al. | 137/627.5 |
| 3,198,586 A | * | 8/1965 | Farmery et al. | 137/627.5 |
| 3,266,851 A | * | 8/1966 | Bueler | 137/627.5 |
| 3,359,043 A | * | 12/1967 | Papin | 137/627.5 |
| 3,606,494 A | * | 9/1971 | Frank et al. | 137/627.5 |
| 4,442,998 A | | 4/1984 | Ohyama et al. | |
| 5,771,933 A | | 6/1998 | Akamatsu et al. | |
| 2004/0118463 A1 | | 6/2004 | Yamamoto | |

FOREIGN PATENT DOCUMENTS

| JP | 56019371 | 2/1981 |
|---|---|---|
| JP | 6436777 | 3/1989 |
| JP | 05072881 | 6/1990 |
| JP | 9222180 A | 8/1997 |
| JP | 09229210 | 9/1997 |
| JP | 2004197585 | 7/2004 |

* cited by examiner

*Primary Examiner* — Craig Schneider
*Assistant Examiner* — Craig J Price
(74) *Attorney, Agent, or Firm* — Harness, Dickey & Pierce, PLC

(57) ABSTRACT

The present invention enlarges the working pressure flowing into the working chamber and improves the response ability of the valve controlling the fluid using a compact solenoid portion. In the control valve according to the present invention, the first effective pressure receiving area of the first pressure sensing spring apparatus, the first pressure receiving area of the first poppet valve and the second pressure receiving area of the second poppet valve are made substantially equal while the second effective pressure receiving area of the second pressure receiving spring apparatus are made larger than the first effective pressure receiving area of the first pressure receiving spring apparatus; and the valve seat body co-operates with the first valve body to close and open the first poppet valve and the second poppet valve in accordance with a pressure of the working fluid flowing into the communication chamber from the third poppet valve when the third poppet valve is opened and the fourth poppet valve is closed by moving the solenoid rod forward.

2 Claims, 5 Drawing Sheets

US 8,413,685 B2

CONTROL VALVE

TECHNICAL FIELD

The present invention relates to a pressure control valve of a fluid, such as a control valve used for the pressure control of a power transmission device. Particularly, the present invention relates to the control valve preventing a malfunction due to unbalanced working fluid pressure acting on a valve body, or malfunction along with a sliding resistance during the operation of the control valve. The present invention relates to the control valve enabling to downsize the valve body while allowing a high pressure control.

BACKGROUND ART

A pressure proportional control valve is known as a related invention to the present invention. This pressure proportional control valve has a constitution as shown in FIG. 5 (for example, refer to Patent document 1). This pressure proportional control valve is a 3 way valve for pressure control of switching clutch provided at a line of a control system at the automatic transmission, for pressure control of a switching brake, and for pressure control of the line.

Here, this preceding pressure proportional control valve will be explained in detail. In FIG. 5, the pressure proportional control valve 100 is constituted from a valve main body 101 and a solenoid 150. A communication chamber 103 is formed at the inside of a main body 102 forming an outer frame of the valve main body 101. In this communication chamber 103, an inflow port 105 communicating with the outside, an outflow port 106 and an outlet port 107 are formed. Furthermore, the communication chamber 103 is divided into a first communication chamber 103A communicating with the inflow port 105 via the partition plate 110, and a second communication chamber 103B communicating with the outflow port 106. At the center of the partition plate 110, a first valve hole surrounding surface 110A is formed. At the side of the first communication chamber 103A of this first valve hole surrounding surface 110A, a first valve seating surface 110B is formed. Also, at the side of the second communication chamber 103B of the first valve hole surrounding surface 110A, a plurality of passage grooves 110C, which does not penetrate towards the axis direction along the surrounding surface, is formed. When a first valve surface 120A of the first valve body 120 opens by separating from the first valve seat surface 110B, this passage groove 110C becomes a flow passage wherein the working fluid flows by working together with an indented portion at the middle of the first valve body 120.

Also, at the main body 102, a first pressure chamber 108 is formed between the first communication chamber 103A and the outlet port 107. At the surrounding surface of this first pressure chamber 108, a first sliding surrounding surface 108A is formed. At the first sliding surrounding surface 108A, a first annular groove which mounts a first seal ring S1 is provided. Furthermore, at the main body 102, a second pressure chamber 109 communicating with the second communication chamber 103B is formed. At the surrounding surface of this second pressure chamber 109, a second sliding surrounding surface 109A is formed. At the second sliding surrounding surface 109A, a second annular groove which mounts a second seal ring S2 is provided.

Also, the first valve body 120 is provided in which an outer circumference surface 120C fits movably to the first sliding surrounding surface 108A of the main body 102 and the first valve hole surrounding surface 110A of the partition plate 110. An axis of this first valve body 120 is provided with a communication passage 120D which communicates with the first pressure chamber 108 and the second pressure chamber 109. Also, this first valve body 120 is pressed resiliently towards a second valve body 125 side by a first spring 140A arranged at the first pressure chamber 108. Furthermore, the first valve body 120 is provided with the first valve surface 120A at the middle portion, and the second valve surface 120B is provided at the edge portion. Also, a second spring 140B is arranged between the first valve body 120 and the second valve body 125; and due to the second spring 140B, the first valve body 120 and the second valve body 125 is pressed resiliently to the opposite direction.

Furthermore, the second valve body 125 which fits movably to the second sliding surrounding surface 109A of the main body 109 is arranged. The second valve body 125 is formed in a cylindrical form, and comprises a second valve seat surface 125A having a taper surface at the inner circumference surface of one end portion. Also, one end of the solenoid rod 151 is connected to the fitting hole provided with a plurality of passage 125C along the circumference surface of other end portion of the second valve body 125. The both end sides of the solenoid rod 151 is guided so that it can freely slide due to the first bearing 154A and the second bearing 154B. Furthermore, the second valve seat surface 125A of the second valve body 125 is opened and closed with the second valve surface 120B by operating the solenoid rod 151 in accordance with the scale of the electrical current flowing to the solenoid 150.

In the operation of the pressure proportional control valve 100 constituted as such, the first valve surface 120A of the first valve body 120 is closed by contacting to the first valve seat surface 110B due to the elasticity of the first spring 140A. Further, the working fluid flowing from the inflow port 105 is blocked by closing this first valve surface 120A. Also, when the solenoid 150 operates, the second valve surface 120B of the first valve body 120 and the second valve seat surface 125A of the second valve body 125 are closed by contacting to each other, and the first valve surface 120A of the first valve body 120 are opened by separating from the first valve seat surface 110B. Due to this opening of the first valve surface 120A, the working fluid flowing from the inflow port 105 flows out to the second communication chamber 103B side. Note that, in the open-close valve state shown in FIG. 5, the first valve body 120 and the second valve body 125 are opened. Hence, the working fluid will flow out from the outflow port 106 to the outlet port 107.

Further, in the pressure proportional control valve 100, the first valve body 120 open and close while the outer circumference surface 120C and the first sliding surrounding surface 108A slides against each other, and at the same time the first seal ring S1 and the outer circumference surface 120C slides with strong friction. Thus, the sliding resistance of the first valve body 120 becomes large during the opening and closing of the valve. Particularly, when the pressure of the working fluid is high, due to this pressure, the first seal ring S1 deforms resiliently by stretched towards the radial direction; hence the first seal ring S1 slides while abrading strongly against the first valve body 120 which contacts closely. Therefore, the sliding resistance of the first valve body 120 becomes large, thus the response performance of opening and closing of the pressure proportional control valve declines.

Also, the outer circumference surface 120C of the first valve body 120 slides together with the first sliding surrounding surface 108A. The working fluid flows in between this sliding surfaces, hence the impurities included in the working fluid may be present therebetween. Thus it causes a delay in the response time of the operation of the first valve body 120 pressed by the first spring 140A in which the force is changed depending on the position which deviates. Furthermore, this first valve body 120 may be pressed against one side of the surface inside the surrounding surface and cause a sticking phenomena (known as hydro lock) at between the sliding surface. As a result, the working characteristic of the pressure proportional control valve 100 changes which causes to enlarge the hysteresis phenomena between the relation of the working fluid pressure and the fluid flow. Further, the constitution which slides the first valve body 120 simultaneously with the two separate axis of the first sliding surrounding surface 108A and the first valve hole surrounding surface 110A requires precise manufacturing thus the cost for assembling and manufacturing raises.

The diameter of the second valve body 125 is formed larger than that of the first valve body 120, hence the force affecting the pressure receiving area of the second valve body 125 becomes large along with the pressure of the working fluid becoming high. If this force becomes large, the output force of the solenoid 150 must become larger which works against this force. Therefore, the solenoid 150 becomes large, and the cost for the solenoid 150 also increases. Also, the sliding resistance during the operation of the second valve body 125 becomes large due to the friction of the second seal ring S2 provided between the outer circumference surface of the second valve body 125 and the second sliding surrounding surface 109A of the main body 102. Furthermore, along with the increase of the pressure of the working fluid, the second seal ring S2 also deforms resiliently such that it is stretched in the radial direction, thus the sliding resistance of the second valve body further increases. Therefore, there is a problem that the solenoid 150 had to be even larger.

Patent document 1: Japanese Patent Laid Open 2004-197858

DISCLOSURE OF INVENTION

Problems to be Solved by the Invention

The present invention is achieved in view of above mentioned problems, and the object of the present invention is to improve the response ability of opening and closing of the valve against the working force of the valve body by making the sliding resistance of the valve body smaller. At the same time, the objective of the present invention is to lower the hysteresis phenomena of the control valve. Also, the objective of the present invention is to improve the response ability of opening and closing of the valve by lowering the sliding resistance of the valve body even when the pressure of the working fluid is high. Furthermore, the objective of the present invention is to lower the cost for processing and assembling the parts of the control valve.

Means for Solving the Problems

The present invention is achieved to resolve the above mentioned technical objectives, and the technical means for solving is constituted as follows.

That is, a control valve of the present invention is a control valve for controlling a pressure of a working fluid by an operation of a solenoid portion, comprising; a main body having a first partition portion parting inside of a valve space chamber into a first valve chamber and a second valve chamber, a second partition portion parting inside of the valve space chamber into the second valve chamber and a third valve chamber, and a third partition portion parting inside of the valve space chamber into the third valve chamber and a fourth valve chamber, a first flow passage penetrating the first partition portion between the first valve chamber and the second valve chamber through to allow the flow of the working fluid, a first valve seat surface working fluid, a third valve seat surface provided around the second flow passage of the second partition portion at a side of the second valve chamber, a communication hole penetrating through the third partition portion between the third valve chamber and the fourth valve chamber, a first supply port communicating with the outer portion of the main body and the first valve chamber to allow the working fluid of a first supply pressure to flow, an outflow port communicating with the outer portion of the main body and the second valve chamber to allow the working fluid of an outflow pressure to flow, a second supply port communicating with the outer portion of the main body and the third valve chamber to allow the working fluid of a second supply pressure to flow, a second outlet port communicating with the outer portion of the main body and the fourth valve chamber to allow the working fluid of a second outlet pressure to flow, a first pressure sensing spring apparatus having a first effective pressure receiving area of a cylindrical form which is resiliently stretchable and also forms a first communication passage in the inner circumference surface thereof by sealingly connecting the circumference portion of one end of the spring apparatus arranged in the first valve chamber to a chamber surface of the main body, a first outlet port communicating with the outer portion of the main body and the first communication passage to allow the working fluid of a first outlet pressure to flow, a first valve body comprising a first valve portion arranged in the first valve chamber by being formed at one end of a first cylindrical portion which loosely fits in the first flow passage, a first valve portion surface provided at a circumference surface of the first valve portion constituting a first poppet valve by separating and contacting to the first valve seat surface with a first pressure receiving area, a second valve portion arranged in the second valve chamber by being formed at other end of the first cylindrical portion, a second valve portion surface provided at a circumference surface of the second valve portion, a second communication passage of a hole penetrating through the inside of the first valve portion, the first cylindrical portion and the second valve portion, and a connecting portion sealingly connected with a free end circumference portion of the first pressure sensing spring apparatus to communicate the first communication passage and the second communication passage, a valve seat body comprising a second valve seat surface having an annular shape constituting a second poppet valve by separating and contacting to the second valve seat portion surface of the first valve body with a second pressure receiving area, a second pressure sensing spring apparatus arranged in the second valve chamber, forming a communication chamber in an inner circumference surface thereof, being resiliently stretchable, and comprising a second effective pressure receiving area having a cylindrical form, a circumference portion of one end of the second pressure sensing spring apparatus being sealingly connected with the second partition portion while surrounding the third valve seat surface, and a free end circumference portion of other end being sealingly connected with the valve seat body, a second valve body comprising a third valve portion arranged in the communication chamber of the second pressure sensing spring apparatus by being formed at one end of a second cylindrical portion loosely fitting in the second flow passage and in the communication hole, a fourth valve portion arranged at an inside of the fourth valve chamber by being formed at other end of the second cylindrical portion, a third communication passage as a hole communicating with the communication chamber by penetrating through the inside of the second cylindrical portion, the third valve portion and the fourth valve portion, a third valve portion surface provided at a circumference surface of the third valve portion to constitute a third poppet valve which contacts and separates to the third valve seat surface with a third pressure receiving area, and a fourth valve seat surface formed at the surrounding surface surrounding one end of the third communication passage of the fourth valve portion, a third valve body comprising a fourth valve portion surface having an annular shape constituting a fourth poppet valve by separating and contacting to the fourth valve seat surface with a fourth pressure receiving area, a third pressure sensing spring apparatus having an resiliently stretchable cylindrical form, in which a circumference portion of one end of the cylindrical form of the third pressure sensing spring is sealingly connected to the third partition portion surrounding the communication hole at a side of the third valve chamber and a circumference portion of other end of the cylindrical form of the third pressure sensing spring is sealingly connected to the second cylindrical portion in the third valve chamber, and a solenoid portion allowing the opening and closing of the fourth poppet valve by moving a solenoid rod connected to the third valve body according to a scale of an electrical current and also allowing the opening and closing of the third poppet valve by pressing the second valve body; wherein; the first effective pressure receiving area of the first pressure sensing spring apparatus, the first pressure receiving area of the first poppet valve and the second pressure receiving area of the second poppet valve are made substantially equal while the second effective pressure receiving area of the second pressure receiving spring apparatus are made larger than the first effective pressure receiving area of the first pressure receiving spring apparatus; and the valve seat body co-operates with the first valve body to close and open the first poppet valve and the second poppet valve in accordance with a pressure of the working fluid flowing into the communication chamber from the third poppet valve when the third poppet valve is opened and the fourth poppet valve is closed by moving the solenoid rod forward.

According to such control valve, since the second pressure sensing spring apparatus can be provided with pilot function therein to enlarge the working force of the first valve body the solenoid portion can be controlled by a high pressure force even when the solenoid portion is made compact. As a result, the control valve can be made compact and the application range can be widened. Also, the first valve body loosely fits inside the first flow passage of the main body, and it does not contact with the first valve hole surface of the outer circumference forming the first flow passage of the main body. Hence the malfunction during the opening and closing of the first valve can be prevented even when the adhesive material included in the working fluid flows inside of the first flow passage. Furthermore, even in the second valve body, similar to the first valve body, the second valve body loosely fits to the second communication passage and the communication hole thus it does not contact with the main body. Hence the sliding resistance is not generated when the second valve body is operating. Therefore, the solenoid portion which makes it possible to become compact can be operated as designed.

Furthermore, the first pressure sensing spring apparatus, the second pressure sensing spring apparatus and the third pressure sensing spring apparatus, which allows each valve body and each valve seat body to operate, have no sliding face against the corresponding member of the main body or so since each pressure sensing spring apparatus only expands and contracts. Hence the malfunction of the valve body due to the attachment of the adhesive material included in the working fluid to the sliding face can be prevented. Also, the first pressure sensing spring apparatus, the second pressure sensing spring apparatus and the third pressure sensing spring apparatus comprises both the spring means and the flow passage of the working fluid; therefore the structure of the control valve can be made simple and the manufacturing cost can be greatly reduced.

Preferably, in the control valve of the present invention, the third pressure receiving area of the third poppet valve, the fourth pressure receiving area of the fourth poppet valve and the third effective pressure receiving area of the third pressure sensing spring apparatus are made substantially equal.

According to the control valve of such constitution, since the third pressure receiving area of the third poppet valve, the fourth pressure receiving area of the fourth poppet valve and the third effective pressure receiving area of the third pressure sensing spring apparatus are made equal, a force which makes the pressure of the working fluid unbalanced with respect to the second valve body will not act thereon. Thus, the solenoid portion can operate as designed. Moreover, the accuracy of the first valve body for controlling the working fluid improves.

BEST MODE FOR CARRYING OUT THE INVENTION

Figure 1:
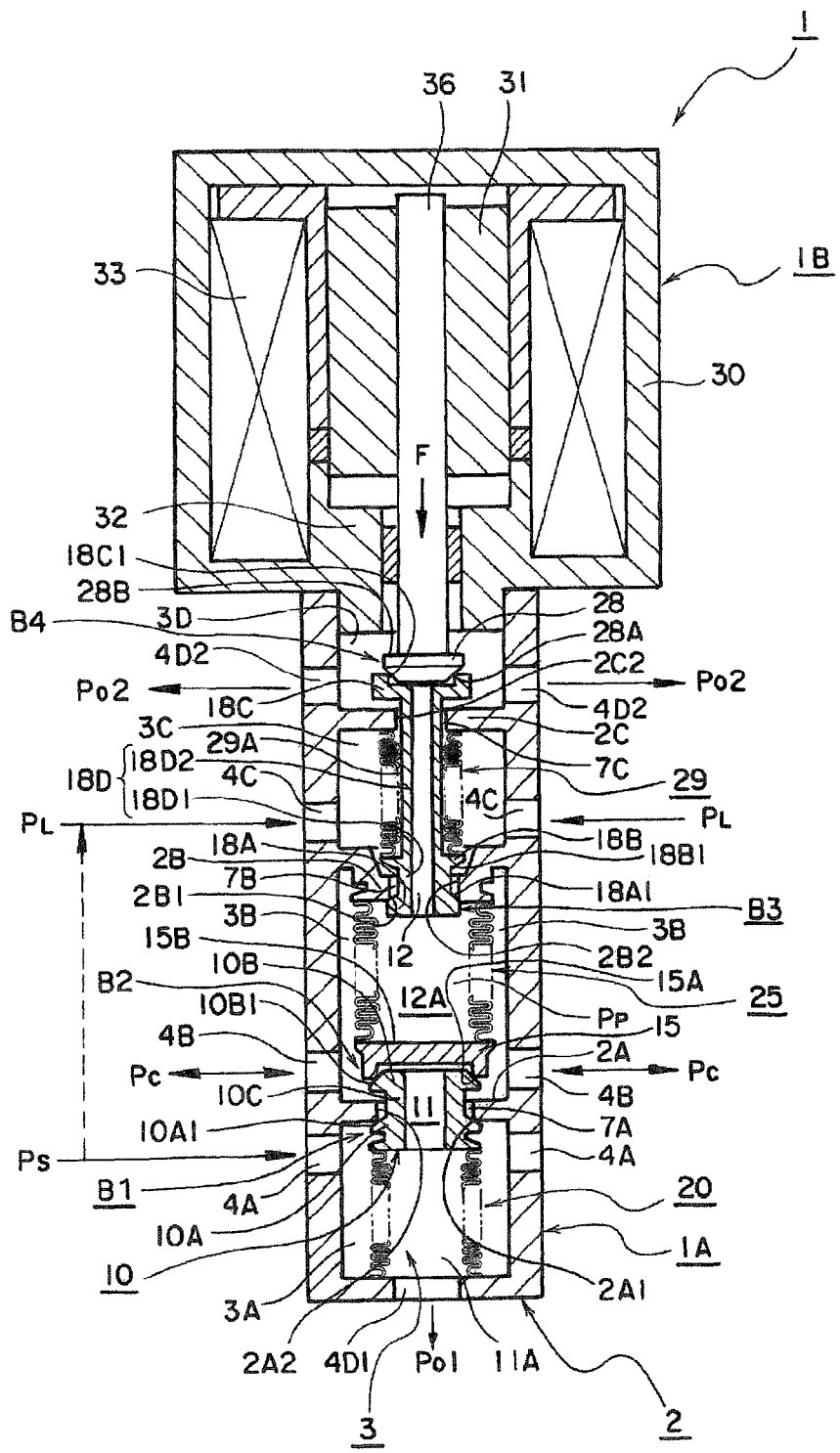
FIG. 1 is a whole cross section of the control valve according to the first example of the present invention.
Figure 4:
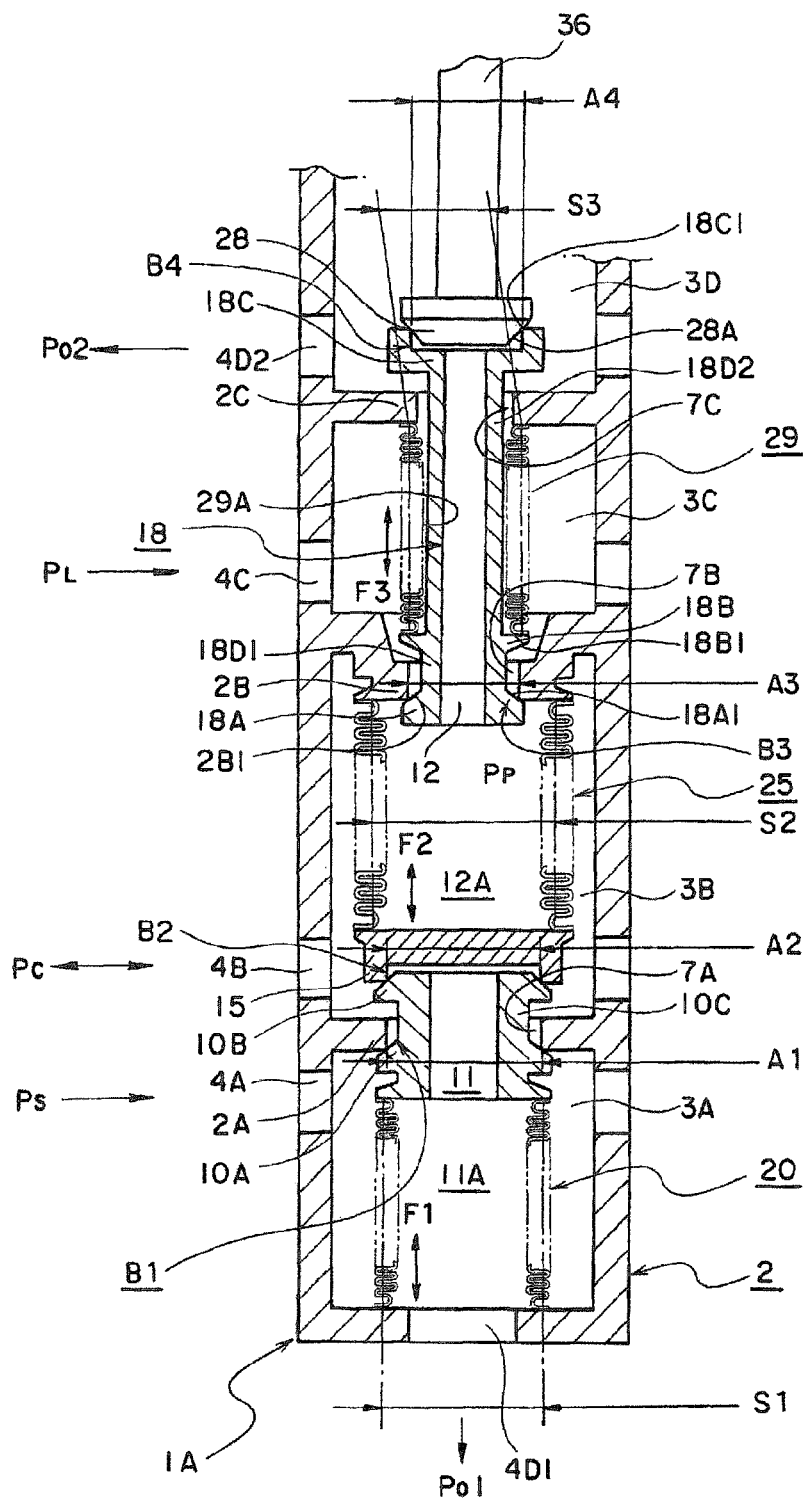
FIG. 4 is an enlarged cross section of the main part of the control valve of FIG. 1.
Figure 5:
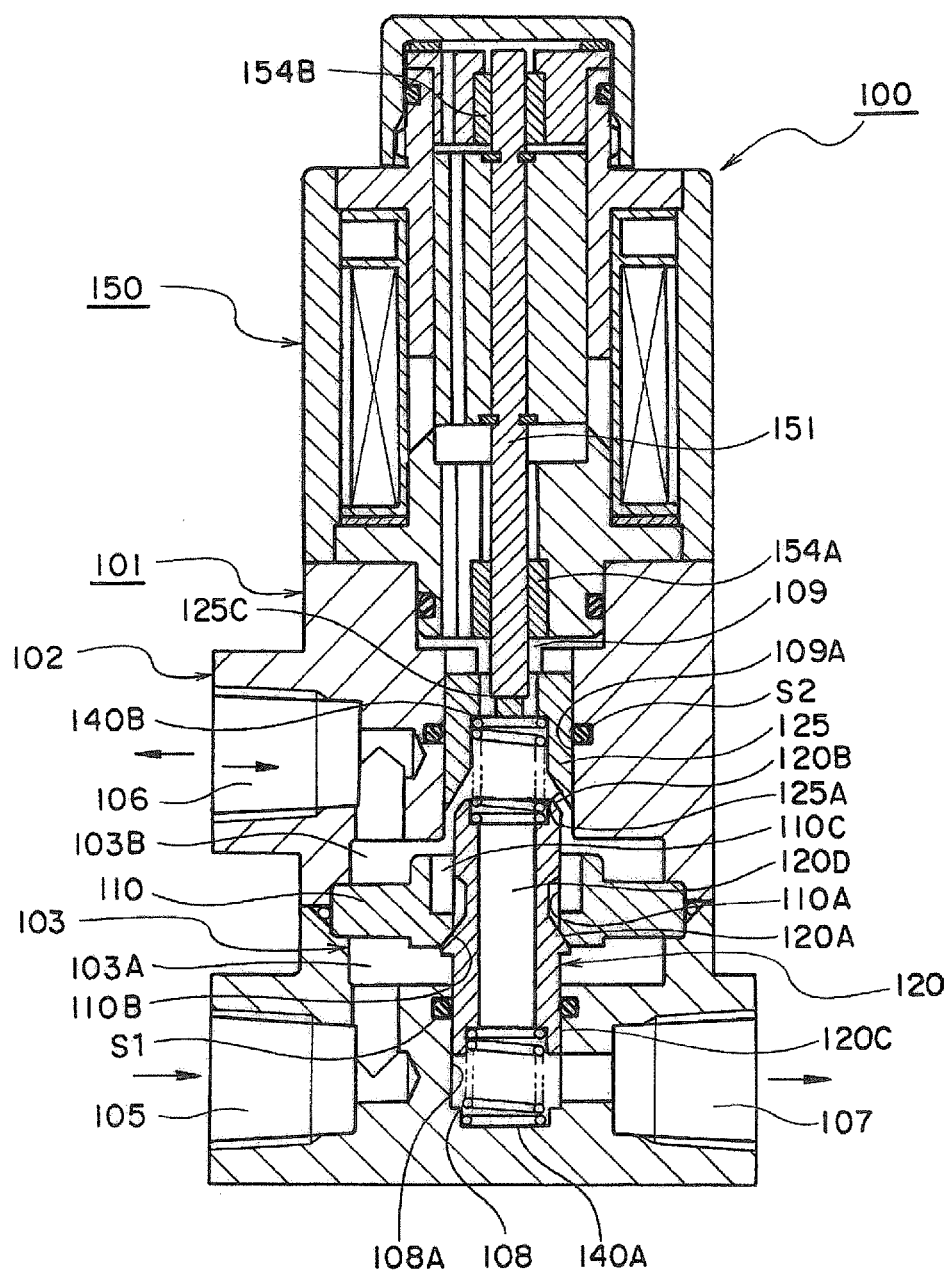
FIG. 5 is a cross section of the control valve of the prior art in connection with the present invention.

Hereinafter, the control valve of the example according to the present invention will be explained based on the figures. Hereinafter, the constitution of the control valve 1 of the example will be explained by referring to FIG. 1 and FIG. 4. Note that, in the explanation of the figures, some of the numerals have been omitted from the figures since it will become complicated if many numerals are described. For those figures, refer to the numerals of other figures. FIG. 1 is a cross section of the constitution of the control valve 1 showing example 1 according to the present invention. Also, FIG. 4 is an enlarged view of the control valve portion 1A of FIG. 1. In regards with FIGS. 1 and 4, the control valve 1 is a pressure proportional control. This control valve 1 connects the control valve portion 1A and the solenoid portion 1B to form as one body. In this control valve portion 1A, the outer flame is the main body 2. Inside of this main body 2, the valve space chamber 3 is provided which has an elongated form in the axial direction. This valve space chamber 3 is divided by, in the order of bottom to top, the first partition portion 2A, the second partition portion 2B and the third partition portion 2C to form the first valve chamber 3A, the second valve chamber 3B, the third valve chamber 3C and the fourth valve chamber 3D. Also, the opening of other end portion of the main body 2 seals the fourth valve chamber 3D from the outside by connecting the end portion of the solenoid portion 1B. Note that, in this example 1, the main body 2 is assembled as one body by screwing the screw provided at each end portion of each divided main body so that each valve body and each pressure sensing spring apparatus which will be described in the following can be arranged in each of the valve chamber 3A, 3B, 3C and 3D. Also, each partition portion 2A, 2B and 2C are formed separately from the main body 2 and are connected when assembling each of the divided main body. Also, the main body 2 is manufactured by a metal such as iron, brass, copper, and aluminum or so; or it is manufactured by a synthetic resin such as industrial plastic, or a special complex resin or so.

Also, in the first partition portion 2A, the first flow passage 7A is provided which is a hole that penetrates the first valve chamber 3A and the second valve chamber 3B, at the axis. The surrounding surface forming this first flow passage 7A is the first valve hole surface 2A2. Also, at the surrounding surface of the first valve chamber 3A side of this first valve hole surface 2A2, the first valve seat surface 2A1 is formed which surrounds the first flow passage 7A. Furthermore, at the main body 2, the first inflow port 4A penetrates to the first valve chamber 3A from the outer circumference surface. Further, the first outlet port 4D1, allowing to pass the working fluid having the first outlet pressure Po1, is formed by penetrating to the outside from the axis of the first valve chamber 3A or the valve space chamber 3. Note that, the plurality of first inflow ports 4A are provided along the circumferential direction. Also, plurality of the outflow ports 4B are provided along the outer circumference surface to allow passing the working fluid having the outflow pressure (control pressure) Pc by penetrating to the second valve chamber 3B from the outer circumference surface of the main body 2.

Furthermore, at the second partition portion 2B, the second flow passage 7B is provided which allows passing the working fluid in the second valve chamber 3B by penetrating through the second valve chamber 3B and the third valve chamber 3C at the axis. The surrounding surface forming this second flow passage 7B is the second valve hole surface 2B2. Further, at the surrounding surface of the second valve chamber 3B side of this second valve hole surface 2B2, the third valve seat surface 2B1 is formed which surrounds the second flow passage 7B. Furthermore, at the third partition portion 2C, the communication hole 7C is provided which penetrates through the third valve chamber 3C and the fourth valve chamber 3D at the axis. The surrounding surface forming this communication hole 7C is the hole surface 2C2. Also, at the third valve chamber 3C, the second inflow port 4C is provided which allows passing the working fluid having the second supply pressure $P_L$ by penetrating from the outside. Further, at the fourth valve chamber 3D, the second outlet port 4D2 is provided which allows discharging the working fluid having the second outlet pressure Po2 in the fourth valve chamber 3D by penetrating from outside.

The above mentioned first inflow port 4A, the outflow port 4B, the second inflow port 4C, the first outlet port 4D1 and the second outlet port 4D2 connects to the duct not shown in the figure in which the working fluid flows. Further, these each port 4A, 4B, 4C, 4D1 and 4D2 allows supply and discharge of the working fluid having each pressure of Ps, Pc, $P_L$, Po1 and Po2 as indicated by the allow of pressure in the figure. Note that, as described in the above, the working fluid having the supply pressure Ps flows in from the first inflow port 4A. Also, the working fluid having the control pressure Pc flows in or out from the outflow port 4B. Further, the working fluid having the second supply pressure $P_L$ flows in to the second supply port 4C (or the working fluid having the first supply pressure Ps can be supplied as shown in the hidden line of FIGS. 2 and 3). Note that, the communication chamber 12A in the second pressure sensing apparatus 25 becomes enlargeable increasing and decreasing pressure Pp by supplying the second supply pressure $P_L$. Further, the working fluid having the first outlet pressure Po1 is discharged from the first outlet port 4D1. Also, the working fluid having the second outlet pressure Po2 (same as the increasing decreasing pressure in the second pressure sensing apparatus 25) is discharged from the second outlet port 4D2.

The first valve body 10 comprises the first valve portion 10A, the second valve portion 10B, and the first cylindrical portion 10C which connects the first valve portion 10A and the second valve portion 10B (the figure does not show the connected each portion of the first valve body 10; however in order to assemble the first valve body 10 in to the first flow passage 7A, for example, the outer circumference surface of the first cylindrical portion 10C is fitted to the fitting hole provided at the end portion of the first valve portion 10A to connect the both parts). Note that, the first valve body 10 is made by a metal such as brass, copper, aluminum, stainless or so, or by synthetic resin or so. Also, in the first valve hole surface 2A2, the first cylindrical portion 10C of the first valve body 10 is arranged in a loosely fitting state having a space. The space between the loosely fitted first cylindrical portion 10C and the first valve hole surface 2A2 becomes the first flow passage 7A which allows the working fluid to flow. This first valve body 10 can make the sliding resistance to zero since it does not slides against the relative surface of the main body 2 even when the first valve body 10 moves for opening and closing.

Furthermore, the first valve body 10 forms the first valve portion 10A as a one body with the first cylindrical portion 10C at the side of the first valve chamber 3A of the first cylindrical portion 10C. At this first valve portion 10A, the first valve portion surface 10A1 is provided in a taper form towards the first cylindrical portion 10C. This first valve portion surface 10A1 of the first valve body 10 closes the valve when contacting with the first valve seat surface 2A1 by moving while inserting the tip into the first valve hole surface 2A2; and the valve is controllably opened in accordance with the opening space while separating from the first valve seat surface 2A1. That is, the first valve portion surface 10A1 and the first valve seat surface 2A1 constitutes the first poppet valve B1 having a form that the cylindrical surface does not fit, unlike the spool valve. Note that, hereinafter, the first poppet valve B1 can make the sliding resistance to zero during the opening and closing of the valve, since the taper surface of the first valve portion surface 10A1 contacts by a very small width to a narrow corner surface of the first valve seat surface 2A1. Also, the cross section area of the inner circumference area where the first valve portion surface 10A1 and the valve seat surface 2A1 contacts is a first pressure receiving area A1 (refer to FIG. 4) receiving the pressure of the working fluid. Note that, preferably, the taper angle of the first valve portion surface 10A1 and the second valve portion surface 10B1 are made about the same. This is due to fact that the same angle of the taper surface of this valve portion surface 10A1 and 10B1 allows the first valve body 10 supported only by the first pressure sensing apparatus 20 to reliably connect against each first and second valve seat surface 2A1 and 15A.

Further, when the first valve portion surface 10A1 opens from the first valve seat surface 2A1, the working fluid having the first supply pressure Ps is supplied to the second valve chamber 3B through the first flow passage 7A from the first valve chamber 3A. Furthermore, the second valve portion 10B made as one body with the first cylindrical portion 10C is arranged in the second valve chamber 3B. At this second valve portion 10B, the second valve portion surface 10B1 is provided in a taper form towards the tip. Also, at an inside of this first valve body 10, the second communication passage 11 is formed which penetrates through the second valve portion 10B via the hole of the first cylindrical portion 10C from the first valve portion 10A.

Also, the first pressure sensing spring apparatus 20 (hereinafter referred to as the first pressure sensing apparatus) arranged in side the first valve chamber 3A is provided by forming the first bellows having a cylindrical form which is bent in a wave form and have the first communication passage 11A inside its own. In this first pressure sensing apparatus 20, the area which receives the pressure of the working fluid is the first effective pressure receiving area S1 (refer to FIG. 4). Also, the function of the first pressure sensing apparatus 20 is a compression spring and the spring force is F1. The circumference surface of the free end circumference portion of the cylindrical body of this first pressure sensing apparatus 20 sealingly connects to the connecting portion of the first valve portion 10A taking the second communication passage 11 as a center, while the circumference surface of the circumference portion of other end sealingly connects to the chamber surface of the first valve chamber 3A taking the outlet port 4D1 as a center.

Preferably, the outer circumference of the first pressure sensing apparatus 20 connecting to the connecting portion of this first valve body 10 are made about the same size. That is, the first communication passage 11 of the first pressure sensing apparatus 20 communicates with the second communication passage 11 of the first valve body 10, and also communicates with the first outlet port 4D1. Also, the first valve body 10 is resiliently pressed towards the solenoid portion 1B by the spring force F1 of the first pressure sensing apparatus 20. Then, when the second valve portion surface 10B1 separates from the second valve seat surface 15A of the valve seat body 15 to open the valve, the second valve chamber 3B and the first outlet port 4D1 can communicate via the second communication passage 11 and the first communication passage 11A. In this example 1, the first pressure receiving area A1 and the first effective pressure receiving area S1 are made about the same. Note that, the "about the same" refers to the range within ±6%; and within this range the effect of the "about the same" can be attained.

Further, the valve seat body 15 forms cylindrical form having a base (a plate form). The second valve seat surface 15A provided at the inner circumference of the corner portion of one end portion of this valve seat body 15 opens and closes the valve by contacting and separating from the second valve portion surface 10B1 of the second valve portion 10B. This second valve portion surface 10B1 and the second valve seat surface 15A contacts by the small connecting width, and constitute the second poppet valve B2 which opens and closes. Note that, the area where the working fluid receives the pressure against the cross section of the inner circumference area where the second valve portion surface 10B1 and the second valve seat surface 15A contacts is the second pressure receiving area A2 (refer to FIG. 4).

Note that, as described in above, when the second poppet valve B2 opens, this first pressure sensing apparatus 20 comprises the first communication passage 11A which allows the working fluid having the controlled pressure Pc to flow out by communicating with the second valve chamber 3B and the second communication passage 11; and also since the first pressure sensing apparatus 20 comprises the function of the spring means, it will only expands and contracts when the valve body 10 is moved. Hence it does not slides against other sliding surfaces, therefore the sliding resistance can be made to zero.

Further, the second pressure sensing spring apparatus (hereinafter pressure sensing apparatus) 25 is arranged in the second valve chamber 3B between the base portion 15B of the valve seat body 15 and the second partition portion 2B of the main body 2 to surround the second flow passage 7B. This second pressure sensing apparatus 25 is formed into a bellows form of the cylindrical body having the wave shape. The inner circumference area of the average diameter where the working fluid of this second pressure sensing apparatus affects is the second effective pressure receiving area S2. Further, the communication chamber 12A is formed inside the second pressure sensing apparatus 25. This second pressure sensing apparatus 25 is designed to have an elastic force of the spring force F2. Also, the circumference portion of one end of the cylindrical portion of this second pressure sensing apparatus 25 sealingly connects to the circumference surface of the base portion 15B; and the circumference portion of other end sealingly connects to the second partition portion 2B by surrounding the second flow passage 7B. Moreover, the second pressure sensing apparatus 25 resiliently supports the valve seat body 15 towards the side of the second valve portion 10B by the resilient spring force F2 having the bellows form. Note that, this second pressure sensing apparatus 25 has a function as the resilient spring force F2, and also has a function to press the valve seat body 15 by expanding the second pressure sensing apparatus 25 by the second supply pressure $P_L$ (increasing and decreasing pressure Pp) of the working fluid when the working fluid flows in to the communication chamber (also refer to as working chamber) 12A. Therefore, the second pressure sensing apparatus 25 only expands and contracts when resiliently moving the valve seat body 15 and does not slides against the relative parts (guiding parts). Hence the friction resistance can be made to zero.

In the second flow passage 7B of the second partition portion 2B and the communication hole 7C of the third partition portion 2C, the second valve body 18, which penetrates therethrough in a loosely fitting state, is arranged (refer to FIG. 4). At this second valve body 18, the third valve portion 18A arranged in the second pressure sensing apparatus 25, the flange portion (convex portion) 18B arranged in the third valve chamber 3C and the fourth valve portion 18C arranged in the fourth valve chamber 3D are formed as one body by second cylindrical portion 18D. That is, the third valve portion 18A and the flange portion 18B are connected by the first body member 18D1. Further, the first body portion 18D1 loosely fitting to the second flow passage 7B provides a space between the second valve hole surface 2B2. Thereby, the working fluid can flow from the second flow passage 7B as a space. Also, the flange portion 18B and the fourth valve body portion 18C can be connected due to the second body portion 18D2. The second body portion 18D2 loosely fitted to the communication hole 7C is provided with a space between the hole surface 2C2 and allows the working fluid having the second outlet pressure $P_O2$ of the fourth valve chamber 3D to flow. Note that, the first body portion 18D1 and the second body portion 18D2 are together referred to as the second cylindrical portion 18D. Also, the second valve body 18 is resiliently supported by the third pressure sensing spring apparatus 29. The circumference portion of one end of the third pressure sensing spring apparatus (hereinafter the third pressure sensing apparatus) sealingly connects to the third partition portion 2C of the side of the third valve chamber 3C by surrounding the communication hole 7C; and also the circumference portion of other end sealingly connects with the flange 18B. Also, the inner circumference surface 29A1 of the third pressure sensing apparatus 29 is provided with the space between the outer circumference surface of the second cylindrical portion 18D to form the flow passage 29A. That is, the fourth valve chamber 3D and the flow passage 29A are communicating with each other, and also the sliding resistance of the second valve body 18 is made to zero since the third pressure sensing apparatus 29 and the second valve body 18 does not slide against each other even when the second valve body 18 is operating. Further, the pressure receiving area of the inner circumference area at the average diameter where the working fluid affects to this third pressure sensing apparatus 29 is the third effective pressure sensing area S3 (refer to FIG. 4). Furthermore, this third pressure sensing apparatus 29 is designed to have the elastic force of the spring force F3; and also resiliently supports the second valve body 18.

Also, this second valve body 18 is provided with the third communication passage 12 penetrating through the axis. This third communication passage 12 communicates with the communication chamber 12A. Further, the opening and closing between the third valve portion surface 18A1 of this third valve portion 18A and the third valve seat surface 2B1 of the second partition portion 2B constitutes the third poppet valve B3. That is, at the side of the flange portion 18B of the third valve portion 18A, the third valve portion surface 18A1 having the taper surface is formed. Also, this third valve portion surface 18A1 opens and closes the third poppet valve B3 by contacting and separating with the third valve seat surface 2B1. The cross section area of the inner circumference area contacting with this third valve portion surface 18A1 and the third valve seat surface 2B1 is the third pressure receiving area A3 where the working fluid affects. Also, preferably, the taper surface 18B1 is formed at the side of the third valve portion 18A of the flange 18B. Furthermore, the fourth valve portion 18C is formed into a plate form and provided with the fourth valve seat surface 18C1 at the circumference surface of the corner portion of the inner circumference surface surrounding the third communication passage 12. The third valve body 28, which is provided with the fourth valve portion surface 28A which opens and closes the valve (the fourth poppet valve B4) by contacting and separating from this fourth valve seat surface 18C1, is arranged at the fourth valve chamber 3D. The fourth valve portion surface 28A of this third valve body 28 is formed towards the fourth valve portion 18C on the taper surface. This fourth valve portion 18C constitutes the fourth poppet valve B4 which opens and closes with the third valve body 28. The cross section area of the inner circumference area where this fourth valve portion surface 28A and the fourth valve seat surface 18C1 contacts is the fourth pressure receiving area A4 (almost the same as the third pressure receiving area A3) where the working fluid affects. Further, at the compressing surface 28B at the upper portion in the figure of the third valve body 28, the bottom end portion shown in the figure of the solenoid rod 36 are connecting or contacting. Further, the third valve body 28 can be pressed when the solenoid portion 1B operates.

In this example 1, the third effective pressure receiving area S3, the third pressure receiving area A3, and the fourth pressure receiving area A4 are made about the same size. Note that, the "about the same" refers to the range within ±6%, and within this range the effect of the "about the same" can be attained. Also, preferably, the pressure is balanced so that the pressure of the working fluid only affects on the one of the surface by flowing into each parts within the solenoid portion 1B.

As mentioned in the above, the solenoid portion 1B connects as one body to the end portion of the control valve portion 1A. This solenoid portion 1B uses the conventionally known constitution for the operation of the control valve 1A; hence it will be briefly explained. The solenoid portion 1B is provided with a movable core 31 therein; and the movable core 31 is connected with the solenoid rod 36. Also, at the opposite position to the movable core 31, the fixed core 32 is provided. Further, at the outer circumference of the movable core 31 and the fixed core 32, the electromagnetic coil is arranged to constitute the electromagnetic circuit. When the electrical current is applied to this electromagnetic coil 33, the movable core 31 is derived to the fixed core 32 by the magnetic force generated in the electromagnetic circuit in accordance with the scale of the electrical current. When this movable core 31 is derived, the solenoid rod 36 which is formed as one body with the movable core 31 presses the third valve body 28 by the working magnetic force F; and also presses the second valve body 18 while stretching the third pressure sensing apparatus 29. The forward movement of the solenoid rod 36 simultaneously opens the third poppet valve by separating the third valve portion surface 18A1 from the third valve seat surface 2B1.

Next, the working state of this control valve 1 will be explained based on FIG. 1, FIG. 2, and FIG. 3. The working state of control valve 1 shown in FIGS. 2 and 3 differs from that of FIG. 1, however it has the same constitution as shown by the same numerals in the control valve 1 of FIG. 1. Since the same numerals as FIG. 1 has been given to FIGS. 2 and 3, the detailed explanation of this constitution will be omitted in here. Note that, the first supply pressure Ps and the second supply pressure $P_L$ has a case in which the working fluid of the same first supply pressure Ps flows to the second supply port 4C as shown by the hidden line in the piping of the first supply port 4C of FIGS. 2 and 3; and a case in which the second supply pressure $P_L$ is changed with respect to the first supply pressure Ps. If the second supply pressure $P_L$ becomes high, the high pressure control of the control valve portion 1A becomes possible due to the compact solenoid portion 1B.

FIG. 1 is the working status of the control valve portion 1A when electrical current is applied to the solenoid portion 1B. At this time, the first poppet valve B1, the second poppet valve B2, the third poppet valve B3 and the fourth poppet valve B4 are closed. Also, the outflow pressure (control pressure) Pc is balanced. Then, the pressure is controlled by controlling the amount of the working fluid having the supply pressure Ps flowing in while each poppet valves B1, B2, B3, and B4 are opened and closed in accordance with the scale of the electrical current applied to the solenoid valve 1B.

Figure 2:
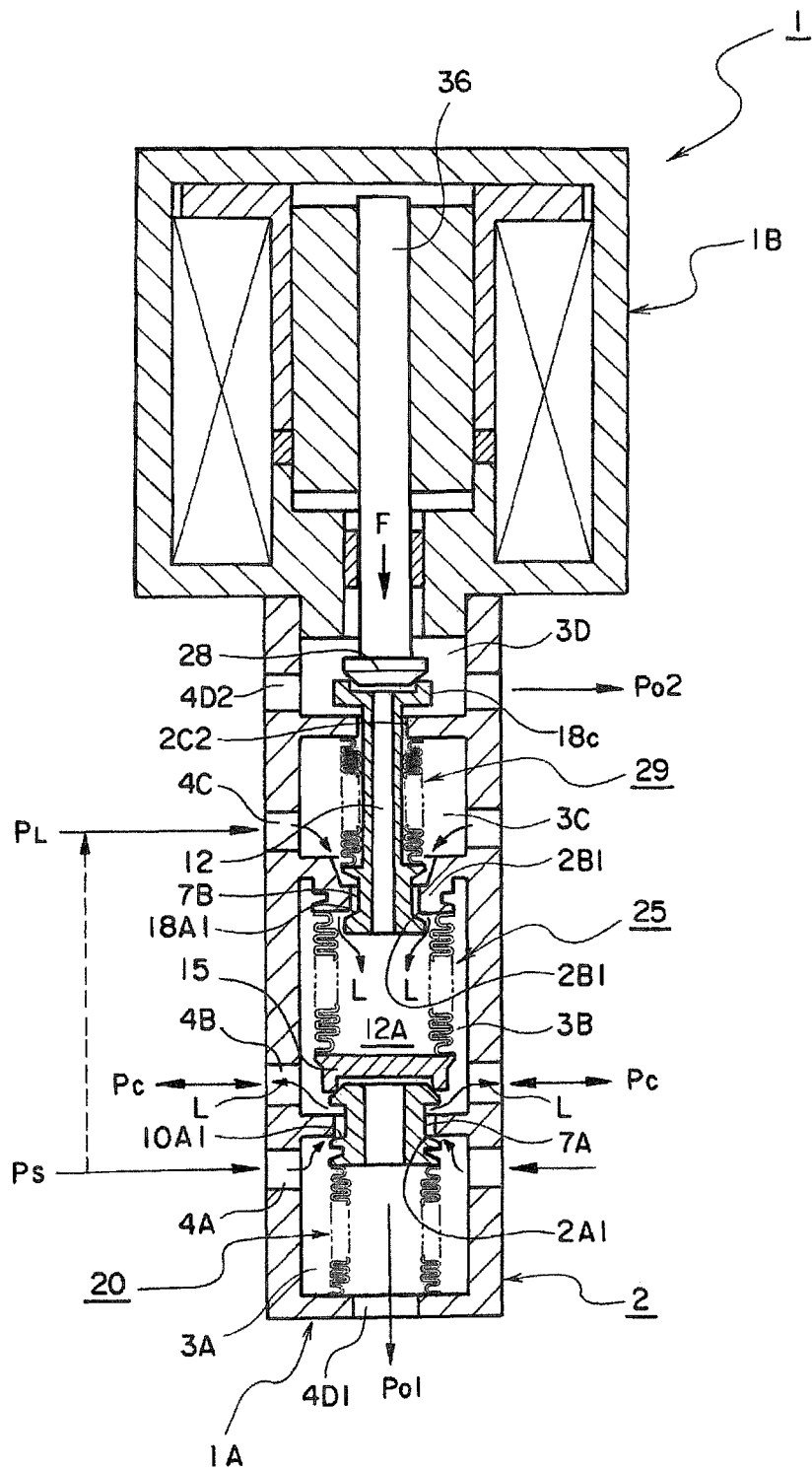
FIG. 2 is a whole cross section of the control valve showing the first working status of FIG. 1.

When the electrical current is further applied to the solenoid portion 1B at the status of FIG. 1; the control valve becomes to the status shown in FIG. 2. That is, the third poppet valve B3 of the second valve body 18 being pressed by the solenoid rod 36 is opened, and allows the working fluid having the second supply pressure $P_L$ to flow as shown by the line L to supply to the communication chamber 12A. Simultaneously, the increasing and decreasing pressure Pp of the communication chamber 12A rises; hence the first valve body 10 is pressed to open the first poppet valve B1 to allow the working fluid having the first supply pressure Ps to flow in to the second valve chamber 3B as shown by the line L to supply to the outflow port 4B. Thus, for example, the working pressure of the hydraulic brake of the automatic transmission or so can be controlled. Thereby, even when the solenoid portion 1B is small and the output force is small, the high pressure control becomes possible.

Figure 3:
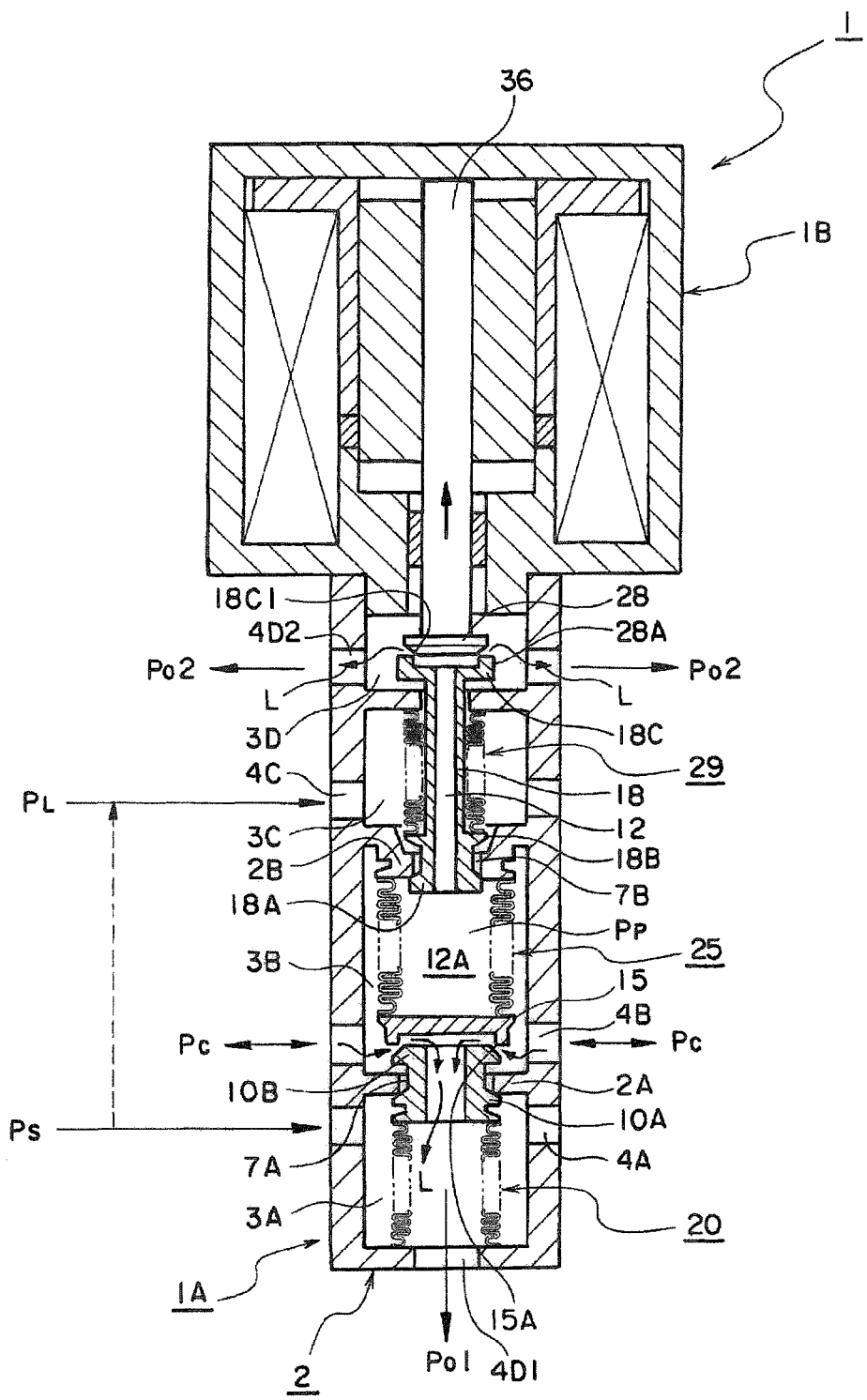
FIG. 3 is a whole cross section of the control valve showing the second working status of FIG. 1.

Next, when the electrical current applied to the solenoid portion 1B is small, the control valve 1 becomes to the status shown in FIG. 3. That is, the first poppet valve B1 and the third poppet valve B3 closes, and the second poppet valve B2 and the fourth poppet valve B4 opens. Hence, the working fluid having the outflow pressure Pc is discharged to the atmosphere side from the first outlet port 4D1 by passing through the second poppet valve B2 via the second communication passage 11 and the first communication passage 11A as shown by the line L. At the same time, the first poppet valve B1 is closed and the supply to the working fluid having the first supply pressure Ps to the second valve camber 3B is stopped. Thereby, for example, the working pressure of the hydraulic brake of the automatic transmission is controlled to stop. Further, the working fluid having the increasing and decreasing pressure Pp of the communication chamber 12A of the second pressure sensing apparatus 25 is discharged to the atmosphere side via the second outlet port 4D2 as shown by the line L. Therefore, the increasing and the decreasing pressure Pp of the communication chamber 12A declines, thus the first poppet valve B1 is closed for certain. The opening and closing of the valve operates depending on the scale of the increasing and decreasing pressure Pp of the communication chamber 12A. Hence, the opening and closing of the control valve 1 can be operated rapidly, and also the high pressure control is possible even when the capacity of the solenoid portion 1B is small. Therefore, the cost for the control valve can be lowered.

Furthermore, both of the first pressure receiving area A1 of the first poppet valve B1 and the second pressure receiving area A2 of the second poppet valve B2 are formed to have the same diameter as the first effective pressure receiving area S1 of the pressure sensing apparatus 20, so that respective forces received by the first pressure receiving area A1 of the first poppet valve B1 and the second pressure receiving area A2 of the second poppet valve B2 from the working fluid are canceled each other. Therefore, at the first valve body 10, no unbalanced force is acting thereon; thus the first valve body 10 is not affected even when the supply pressure Ps is changed. Furthermore, the third pressure receiving area A3 of the third poppet valve B3, the fourth pressure receiving area A4 of the fourth poppet valve B4, and the third effective pressure receiving area S3 of the third pressure sensing apparatus 29 are formed to have the same area, thus the each force receiving from the working fluid are canceled. Hence, the working force of the solenoid portion 1B allows the second valve body 18 to operate precisely; thereby the working fluid can be controlled precisely due to the operation of the second valve body 18. Further, this control valve 1 can enlarge and control the force which closes and opens the first poppet valve B1 and second poppet valve B2 of this first valve body 10, depending on the scale of the increasing and decreasing pressure Pp of the communication chamber 12A. Also, due to this controlled opening and closing of this first poppet valve B1, the first supply pressure Ps of the working fluid flowing to the second valve chamber 3B from the first valve chamber 3A can proportionally control the pressure of the fluid of the working apparatus provided thereto.

Next, the constitution of the control valve 1 allowing the pressure proportional control of the control pressure Pc by the solenoid portion 1B will be described. The following is the balance equation of the force of the control valve 1 when the first poppet valve B1, the second poppet valve B2, the third poppet valve B3 and the fourth poppet valve B4 are closed as shown in FIG. 1.

Note that,
F is the working magnetic force of the solenoid portion 1B;
F1 is the first spring force of the first pressure sensing apparatus 20;
F2 is the second spring force of the second pressure sensing apparatus 25;
F3 is the third spring force of the third pressure sensing apparatus 29;
S1 is the first effective pressure receiving area of the first pressure sensing apparatus 20;
S2 is the second effective pressure receiving area of the second pressure sensing apparatus 25;
S3 is the third effective pressure receiving area of the third pressure sensing apparatus 29:
A1 is the first pressure receiving area of the closed valve inner circumference area at the first poppet B1;
A2 is the second pressure receiving area of the closed valve inner circumference area at the second poppet B2;
A3 is the third pressure receiving area of the closed valve inner circumference area at the third poppet B3;
A4 is the fourth pressure receiving area of the closed valve inner circumference area at the fourth poppet B4;
Ps is the first supply pressure;
Pc is the outflow pressure (the control pressure);
$P_L$ is the second supply pressure;
Po1 is the first outlet pressure;
Po2 is the second outlet pressure; and
S3=A3=A4, S1=A1=A2.

The balance equation of the force when the third poppet valve B3 and second poppet valve B4 are closed is:

$$F-P_L(S3-A3)-PpA3+F3=0 \qquad \text{(equation 1)}.$$

Also, the balance equation of the force when the first poppet valve B1 and the second poppet valve B2 are closed is:

$$PpS2+F2-Pc(S2-A2)+Ps(S1-A1)=0 \qquad \text{(equation 2)}.$$

In this equation, S3=A3=A4, S1=A1=A2. (Note that, the influence of the force receiving from the working fluid can be made small without making the area of the fourth pressure receiving area A4 and the third pressure receiving area the same; however if A3=A4, the relationship between the electrical current of the solenoid and the communication chamber 12A is improved.).

When the equation 1 is simplified, it is $$F-PpA3+F3=0,$$

$$Pp=(F+F3)/A3 \qquad \text{(equation 3)}.$$

When the equation 2 is simplified, it is $$PpS2+F2-Pc(S2-A2)=0$$

$$Pc=(PpS2+F2)/(S2-A2) \qquad \text{(equation 4)}.$$

By using the equations 3 and 4, the increasing and decreasing pressure Pp can be controlled by the working magnetic force F, and the working magnetic force F becomes almost as same as the control pressure Pc×the fourth pressure receiving area A4.

Also, the magnification of controlling the control pressure Pc by the increasing and decreasing pressure is approximately: increasing and decreasing pressure Pp*S2/(S2−A2).

Thus, by using the pilot mechanism of the second pressure sensing apparatus 25, the high pressure control of the control valve portion 1B is possible due to the compact solenoid portion 1B.

In the pressure proportional control of the conventional control valve, when the sliding resistance is generated during the operation of the valve body, it was difficult to control the pressure as designed. However, in the control valve 1 of the present invention, the contact surface when opening and closing the first poppet valve B1, the second poppet valve B2, the third poppet valve B3, and the fourth poppet valve B4, contacts by small width such as it is a line contact allows the separation and contact. Thus, the sliding resistance during closing and opening of the valve can be made small. Also, the first pressure sensing apparatus 20, the second pressure sensing apparatus 25, the third pressure sensing apparatus 29 are not provided with the sliding portion, thus no sliding resistance is generated. Therefore, due to the working magnetic force F corresponding to the electrical current flowing in the solenoid portion 1B, the pressure proportional control is possible by opening and closing the first poppet valve B1, the second poppet valve B2, and the third poppet valve B3.

Industrial Applicability

As mentioned hereinabove, the control valve of the present invention is useful for the hydraulic pressure system of the vehicle by making the solenoid portion compact, and for the low cost control valve of the fluid flowing in the hydraulic and pneumatic system of the motion transfer apparatus or so. Particularly, the control valve is useful as the control valve having no malfunction and small sliding resistance.

The invention claimed is:

1. A control valve for controlling a pressure of a working fluid by an operation of a solenoid portion, comprising;
   a main body having a first partition portion parting inside of a valve space chamber into a first valve chamber and a second valve chamber, a second partition portion parting inside of the valve space chamber into the second valve chamber and a third valve chamber, and a third partition portion parting inside of the valve space chamber into the third valve chamber and a fourth valve chamber,
   a first flow passage penetrating the first partition portion between the first valve chamber and the second valve chamber through to allow the flow of the working fluid,
   a first valve seat surface provided around the first flow passage of the first partition portion at a side of the first valve chamber,
   a second flow passage penetrating the second partition portion between the second valve chamber and the third valve chamber through to allow the flow of the working fluid,
   a third valve seat surface provided around the second flow passage of the second partition portion at a side of the second valve chamber,
   a communication hole penetrating through the third partition portion between the third valve chamber and the fourth valve chamber,
   a first supply port communicating with the outer portion of the main body and the first valve chamber to allow the working fluid of a first supply pressure to flow, an outflow port communicating with the outer portion of the main body and the second valve chamber to allow the working fluid of an outflow pressure to flow,
   a second supply port communicating with the outer portion of the main body and the third valve chamber to allow the working fluid of a second supply pressure to flow,
   a second outlet port communicating with the outer portion of the main body and the fourth valve chamber to allow the working fluid of a second outlet pressure to flow,
   a first pressure sensing spring apparatus having a first effective pressure receiving area of a cylindrical form which is resiliently stretchable and also forms a first communication passage in the inner circumference surface thereof by sealingly connecting the circumference portion of one end of the spring apparatus arranged in the first valve chamber to a chamber surface of the main body,
   a first outlet port communicating with the outer portion of the main body and the first communication passage to allow the working fluid of a first outlet pressure to flow,
   a first valve body comprising a first valve portion arranged in the first valve chamber by being formed at one end of a first cylindrical portion which loosely fits in the first flow passage, a first valve portion surface provided at a circumference surface of the first valve portion constituting a first poppet valve by separating and contacting to the first valve seat surface with a first pressure receiving area, a second valve portion arranged in the second valve chamber by being formed at an other end of the first cylindrical portion, a second valve portion surface provided at a circumference surface of the second valve portion, a second communication passage of a hole penetrating through the inside of the first valve portion, the first cylindrical portion and the second valve portion, and a connecting portion sealingly connected with a free end circumference portion of the first pressure sensing spring apparatus to communicate the first communication passage and the second communication passage,
   a valve seat body comprising a second valve seat surface having an annular shape constituting a second poppet valve by separating and contacting to the second valve seat portion surface of the first valve body with a second pressure receiving area, a second pressure sensing spring apparatus arranged in the second valve chamber, forming a communication chamber in an inner circumference surface thereof, being resiliently stretchable, and comprising a second effective pressure receiving area having a cylindrical form, a circumference portion of one end of the second pressure sensing spring apparatus being sealingly connected with the second partition portion while surrounding the third valve seat surface, and a free end circumference portion of other end being sealingly connected with the valve seat body,
   a second valve body comprising a third valve portion arranged in the communication chamber of the second pressure sensing spring apparatus by being formed at one end of a second cylindrical portion loosely fitting in the second flow passage and in the communication hole, a fourth valve portion arranged at an inside of the fourth valve chamber by being formed at an other end of the second cylindrical portion, a third communication passage as a hole communicating with the communication chamber by penetrating through the inside of the second cylindrical portion, the third valve portion and the fourth valve portion, a third valve portion surface provided at a circumference surface of the third valve portion to constitute a third poppet valve which contacts and separates to the third valve seat surface with a third pressure receiving area, and a fourth valve seat surface formed at a surrounding surface surrounding one end of the third communication passage of the fourth valve portion,
   a third valve body comprising a fourth valve portion surface having an annular shape constituting a fourth poppet valve by separating and contacting to the fourth valve seat surface with a fourth pressure receiving area,
   a third pressure sensing spring apparatus having an resiliently stretchable cylindrical form, in which a circumference portion of one end of the cylindrical form of the third pressure sensing spring is sealingly connected to the third partition portion surrounding the communication hole at a side of the third valve chamber and a circumference portion of an other end of the cylindrical form of the third pressure sensing spring is sealingly connected to the second cylindrical portion in the third valve chamber, and
   the solenoid portion allowing the opening and closing of the fourth poppet valve by moving a solenoid rod connected to the third valve body according to a scale of an electrical current and also allowing the opening and closing of the third poppet valve by pressing the second valve body; wherein;

the first effective pressure receiving area of the first pressure sensing spring apparatus, the first pressure receiving area of the first poppet valve and the second pressure receiving area of the second poppet valve are made substantially equal while the second effective pressure receiving area of the second pressure receiving spring apparatus are made larger than the first effective pressure receiving area of the first pressure receiving spring apparatus; and the valve seat body co-operates with the first valve body to close and open the first poppet valve and the second poppet valve in accordance with a pressure of the working fluid flowing into the communication chamber from the third poppet valve when the third poppet valve is opened and the fourth poppet valve is closed by moving the solenoid rod forward.

2. The control valve according to claim 1 wherein the third pressure receiving area of the third poppet valve, the fourth pressure receiving area of the fourth poppet valve and the third effective pressure receiving area of the third pressure sensing spring apparatus are made substantially equal.

* * * * *